US009261591B2

(12) United States Patent
Kunst et al.

(10) Patent No.: US 9,261,591 B2
(45) Date of Patent: Feb. 16, 2016

(54) MEASUREMENT AGENT, A TAG, A METHOD FOR MEASURING, A METHOD FOR SERVING MEASURING AND A COMPUTER PROGRAM PRODUCT

(75) Inventors: Peter Johan Kunst, Groningen (NL); Bertram Jeroen Broekhuijsen, Groningen (NL); Kristian Alexander Helmholt, Groningen (NL)

(73) Assignee: NEDERLANDSE ORGANISATIE VOOR TOEGEPAST-NATUURWETENSCHAPPELIJK ONDERZOEK TNO, Delft (NL)

(*) Notice: Subject to any disclaimer, the term of this patent is extended or adjusted under 35 U.S.C. 154(b) by 822 days.

(21) Appl. No.: 13/126,823

(22) PCT Filed: Oct. 30, 2009

(86) PCT No.: PCT/NL2009/050657
§ 371 (c)(1),
(2), (4) Date: Oct. 11, 2011

(87) PCT Pub. No.: WO2010/050814
PCT Pub. Date: May 6, 2010

(65) Prior Publication Data
US 2012/0146836 A1    Jun. 14, 2012

(30) Foreign Application Priority Data
Oct. 30, 2008   (EP) ..................................... 08167986

(51) Int. Cl.
*G01S 13/08*    (2006.01)
*G01S 13/82*    (2006.01)

(52) U.S. Cl.
CPC ..................................... *G01S 13/82* (2013.01)

(58) Field of Classification Search
CPC ...... G01S 13/84; G01S 13/878; G01S 13/767; G01S 13/751; G01S 13/82
USPC ........................ 342/51, 85, 86, 118, 129, 135
See application file for complete search history.

(56) References Cited

U.S. PATENT DOCUMENTS

| 3,305,861 A | 2/1967 | Webb |
| 4,315,260 A | 2/1982 | Kupfer |

(Continued)

FOREIGN PATENT DOCUMENTS

| DE | 102 38 887 A1 | 3/2004 |
| WO | 2007/085517 A1 | 8/2007 |

*Primary Examiner* — John B Sotomayor
*Assistant Examiner* — Marcus Windrich
(74) *Attorney, Agent, or Firm* — Novak Druce Connolly Bove + Quigg LLP

(57) ABSTRACT

A measurement agent for measuring a distance from the agent to a tag may include a transmitter and receiver for transmitting and receiving radio wave signals. The agent is arranged for changing the agent transmitter from a particular state wherein the agent transmitter transmits a particular radio wave interrogation signal towards a further state determined by the agent wherein the agent transmitter transmits a further radio wave interrogation signal when a signal behavior of a received radio wave response signal changes. Further, the measurement agent includes a counter for determining a time period between transmittance of a first radio wave interrogation signal and receipt of a radio wave response signal having a predetermined signal behavior. The agent also includes a processor for computing a distance between the agent and the tag, based on the determined time period and a multiple number of radio wave interrogation signals.

20 Claims, 11 Drawing Sheets

(56) References Cited

U.S. PATENT DOCUMENTS

| | | | |
|---|---|---|---|
| 4,604,733 A * | 8/1986 | Brown et al. | 367/2 |
| 4,757,315 A * | 7/1988 | Lichtenberg et al. | 342/125 |
| 5,416,486 A | 5/1995 | Koert et al. | |
| 6,100,840 A * | 8/2000 | Zidek et al. | 342/42 |
| 6,577,266 B1 * | 6/2003 | Axline | 342/42 |
| 7,119,738 B2 * | 10/2006 | Bridgelall et al. | 342/129 |
| 7,714,773 B2 * | 5/2010 | Ozaki et al. | 342/118 |
| 2006/0109159 A1 | 5/2006 | Holly | |
| 2007/0241904 A1 * | 10/2007 | Ozaki et al. | 340/572.1 |
| 2008/0143584 A1 * | 6/2008 | Shoarinejad et al. | 342/127 |
| 2008/0150699 A1 | 6/2008 | Ohara et al. | |
| 2008/0204245 A1 * | 8/2008 | Blair et al. | 340/572.1 |
| 2010/0231410 A1 | 9/2010 | Seisenberger et al. | |

* cited by examiner

MEASUREMENT AGENT, A TAG, A METHOD FOR MEASURING, A METHOD FOR SERVING MEASURING AND A COMPUTER PROGRAM PRODUCT

CROSS-REFERENCE TO RELATED APPLICATIONS

This application is filed under 35 U.S.C. 371 as a U.S. national phase application of PCT/NL2009/050657, having an international filing date of 30 Oct. 2009, which claims the benefit of European Patent Application No. 08167986.2, having a filing date of 30 Oct. 2008, both of which are hereby incorporated by reference.

TECHNICAL FIELD

The invention relates to a measurement agent for measuring, in a contactless way and in cooperation with a tag, a distance to said tag.

BACKGROUND

In known contactless distance measurement devices, the measurement principle is based on a relative strength of received radio wave signals. When the distance between the measuring agent and the object increases, however, also the measurement inaccuracy increases. Further, complex timing synchronisation schedules are applied to enable multiple measurement agents to perform a measurement. In addition, relatively complex and expensive electronic components are used for a practical implementation of the known measurement principle.

It may be desirable to provide a measurement agent, wherein at least one of the disadvantages identified above is reduced. In particular, the invention aims at obtaining a measurement agent wherein the measurement inaccuracy is less dependent on the distance between the agent and the tag.

SUMMARY

Thereto, according to the invention, the measurement agent comprises a transmitter for subsequently transmitting a multiple number of radio wave interrogation signals to a receiver of the tag, the subsequent radio wave signals having a mutually different signal behaviour, and a receiver for receiving a radio wave response signal transmitted by a transmitter of the tag, wherein the agent is arranged for changing the agent transmitter from a particular state determined by the agent wherein the agent transmitter transmits a particular radio wave interrogation signal towards a further state wherein the agent transmitter transmits a further radio wave interrogation signal when a signal behaviour of the received radio wave response signal changes.

The measurement agent further comprises a counter for determining a time period starting at the start of transmitting a first radio wave interrogation signal and ending upon receipt of a radio wave response signal having a predetermined signal behaviour, and a processor for computing a distance between the agent and the tag, based on the determined time period and the multiple number of radio wave interrogation signals that have subsequently been transmitted by the agent transmitter.

By subsequently transmitting a multiple number of radio wave interrogation signals to a receiver of the tag wherein the change to a particular subsequent interrogation signal is triggered by the receipt of a changed radio wave response signal, a sequence of signals can be transmitted in a sequence between the agent and the tag. When the agent changes the state of the agent transmitter, the further state is determined by the agent. Further, by determining a time period starting at the start of transmitting a first radio wave interrogation signal and ending upon receipt of a radio wave response signal having a predetermined signal behaviour, a distance between the agent and the tag can be computed using the total number of radio wave interrogation signals that have traveled towards the tag.

Similar to the agent, the tag is arranged for changing a tag transmitter from a particular state wherein the tag transmitter transmits a particular radio wave response signal towards a further state determined by the tag wherein the tag transmitter transmits a further radio wave response signal when a signal behaviour of the received radio wave interrogation signal changes. Here, the further state may be determined by the tag.

The accuracy of the distance measurement principle depends on the radio wave velocity accuracy and the inaccuracy of the counter determining the time period. Therefore, the accuracy is substantially constant and mainly independent on the distance between the agent and the tag. When said distance becomes too large for a proper measurement, an implicit feedback occurs, since no clear radio wave response signal is then received that is needed for changing the transmitting state of the measurement agent. As a result, an in-band inaccuracy detection is included in the measurement.

Further, since no complex time synchronisation scheme is applied, the agent and the corresponding tag can advantageously be implemented using relatively simple and cheap components. In particular, the tag can be implemented using a minimum of complex and/or expensive components as it is sufficient to provide the tag with a transmitter, a receiver and a component for changing the transmitted response signal when a signal behaviour of the received radio wave interrogation signal changes. The tag can be mounted or attached to an object to be observed.

Preferably, the mutually different signal behaviour of the multiple number of radio wave interrogation signals comprises mutually different spectra. Thus, the subsequent interrogation signals have e.g. mutually different central frequencies allowing a relatively simple implementation. Such signals can relatively simply be generated by shifting its central frequency in a desired way. During operation, the measurement first sends a first interrogation signal which signal is retransmitted by the tag while shifting the central frequency. Similarly, the signal is converted to a signal having a further central frequency at receipt at the agent. This process carries on until the measurement agent determines that the received signal has a pre-determined behaviour, e.g. a central frequency falling in a pre-determined frequency band thereby triggering the counter.

It is noted that, alternatively, also signals having other mutually different signal behaviour can be applied, e.g. having different amplitude and/or phase information.

The measurement agent can be used for determining a distance to a tag, and, in combination with measurement from other agents, also for determining a location of a tag. Since the measurement principle is highly scalable, an indoor measurement can be performed as well as an outdoor measurement, such as on urban or country area scale.

The components of the measurement agent and/or the tag, or a combination of said components can be implemented using discrete components or as a system-on-chip providing a potentially very cheap distance measurement tool.

The invention also relates to a tag.

Further, the invention relates to a method of measuring.

The invention also relates to a method of serving measuring.

In addition, the method relates to a computer program product.

Modifications and variations of the computer program product, which correspond to the described modifications and variations of the corresponding method can be carried out by a person skilled in the art on the basis of the present description.

Other advantageous embodiments according to the invention are described in the following claims.

BRIEF DESCRIPTION OF THE DRAWINGS

By way of example only, embodiments of the present invention will now be described with reference to the accompanying figures in which.

DETAILED DESCRIPTION

It is noted that the figures shows merely preferred embodiments according to the invention. In the figures, the same reference numbers refer to equal or corresponding parts.

Figure 1:
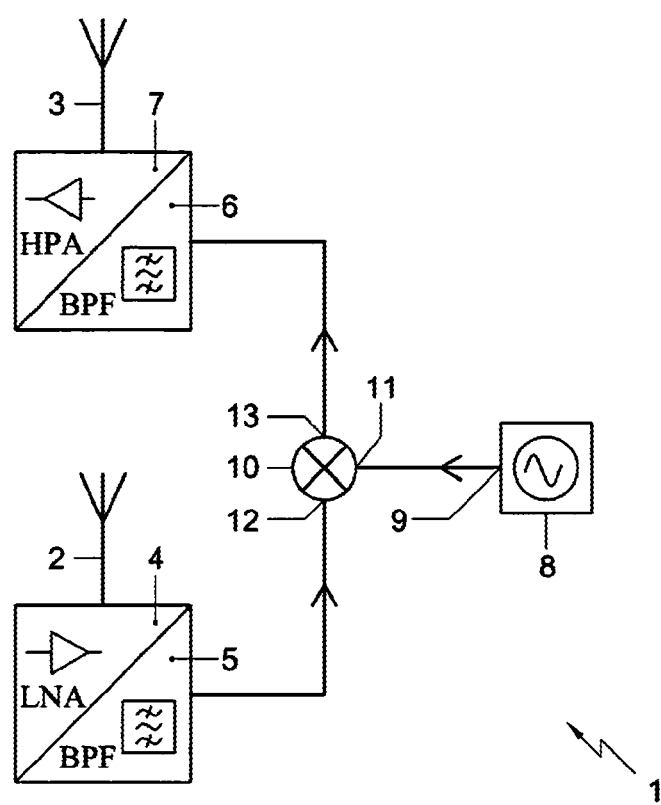
FIG. 1 shows a schematic view of a tag according to the invention.

FIG. 1 shows a schematic view of a tag 1 according to the invention. The tag 1 serves for performing a distance measurement from a measurement agent to the position of the tag. Thereto, the tag 1 comprises a receiver 2 and a transmitter 3 for receiving and transmitting, respectively, radio waves. Further, the tag 2 comprises a broadband low noise amplifier 4 and a band pass filter 5 for processing a radio wave signal received by the receiver 2. The tag 2 also comprises a further band pass filter 6 and a high power amplifier 7 for pre-processing a signal to be transmitted by the transmitter 3.

In addition, the tag 1 comprises a local oscillator 8 having an output port 9 that is connected to an input port 11 of a mixer 10. A received signal that has been processed by the broadband low noise amplifier 4 and the band pass filter is fed to a further input port 12 of the mixer 10. Further, an output port 13 of the mixer 10 is connected to the band pass filter 6 and the high power amplifier 7 for being transmitted by the transmitter 3.

Figure 2:
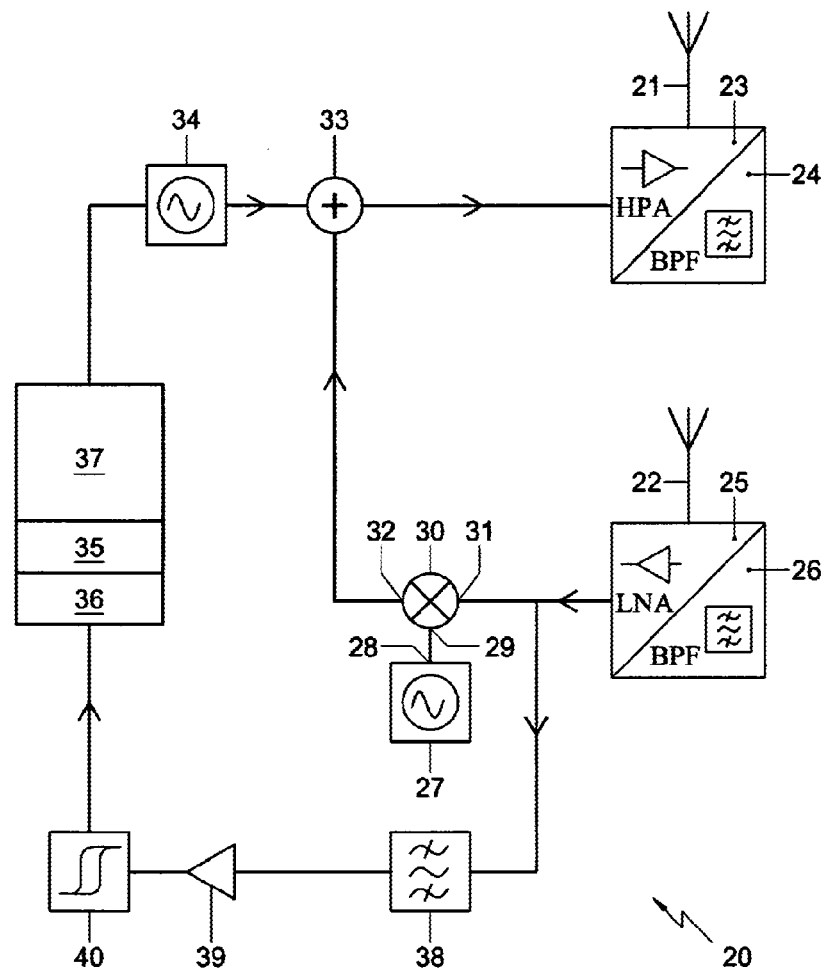
FIG. 2 shows a schematic view of a first embodiment of a measurement agent according to the invention.

FIG. 2 shows a schematic view of a first embodiment of a measurement agent 20 according to the invention. The agent 20 also comprises a transmitter 21 and a receiver 22 for transmitting and receiving radio wave signals. Similarly, the agent 20 comprises a power amplifier 23 and a band pass filter 24 pre-processing a signal to be transmitted by the transmitter 21, and a broadband low noise amplifier 25 and a further band pass filter 26 for processing a radio wave signal received by the receiver 22.

Analogously, the agent 20 comprises a local oscillator 27 having an output port 28 that is connected to an input port 29 of a mixer 30. A received signal that has been processed by the broadband low noise amplifier 25 and the band pass filter 26 is fed to a further input port 31 of the mixer 30. Further, an output port 32 of the mixer 30 is connected to the band pass filter 24 and the high power amplifier 23 for being transmitted by the transmitter 21. The agent 20 further comprises an adder 33 and a carrier generator 34, the adder 33 combining the signal of the mixer output port 32 with a carrier signal generated by the carrier generator 34.

In addition, the agent 20 comprises a first and second counter 35, 36 and a processor 37. A received signal, received by the receiver 22 and processed by the broadband low noise amplifier 25 and the further band pass filter 26, is input to subsequently a yet further band pass filter 38, a logarithmic amplifier 39 and a Schmitt trigger 40 and then used as information for triggering the first and second counter 35, 36 as explained in more detail below.

The local oscillators 8, 27 can e.g. be implemented as a harmonic signal generator based on a crystal or micro electromechanical system (MEMS). The mixers 10, 30 can e.g. be implemented as a ring mixer, such as a Gilbert cell.

The measurement agent 20 and the tag 1 can be used for performing a method for measuring, in a contactless way, a distance from the measurement agent 20 and the tag 1.

During operation, the transmitter 21 of the agent 20 subsequently transmits a multiple number of radio wave interrogation signals to the receiver 2 of the tag 1. Here, the subsequent radio wave signals have a mutually different signal behaviour. More specifically, the mutually different signal behaviour of the multiple number of radio wave interrogation signals comprises mutually different spectra. As an example, a first radio wave interrogation signal has a first interrogation central frequency while a second radio wave interrogation signal has a second interrogation central frequency, different from the first central frequency. At the start of a measurement procedure, the transmitter 21 of the agent 20 transmits a first radio wave interrogation signal, also called the carrier signal. Simultaneously, the first counter 35 is started. The receiver 22 of the agent 20 is arranged for receiving a radio wave response signal transmitted by the transmitter 3 of the tag 1.

After the first radio wave interrogation signal has been transmitted, said signal is received by the receiver 2 of the tag 1. Also the transmitter 3 of the tag 1 is arranged for subsequently transmitting a multiple number of radio wave response signals, upon receipt of the radio wave interrogation signal, the subsequent radio wave signals having a mutually different signal behaviour. As is the case with the measurement agent 20, the mutually different signal behaviour of the multiple number of radio wave response signals comprises mutually different spectra. Thus, after receipt of the first radio wave interrogation signal at the tag 1, a first radio wave response signal having a first response central frequency is transmitted by the transmitter 3 of the tag 1.

Further, the agent 20 is arranged for changing the agent transmitter 21 from a particular state wherein the agent transmitter 21 transmits a particular radio wave interrogation signal, e.g. a first radio wave interrogation signal, towards a further state wherein the agent transmitter 21 transmits a further radio wave interrogation signal, e.g. second radio wave interrogation signal, when a signal behaviour of the received radio wave response signal changes. Thus, after receipt of the first radio wave response signal at the receiver 22 of the agent 20, the agent transmitter 21 transmits a second radio wave interrogation signal having another central frequency than the central frequency of the preceding, first radio wave interrogation signal.

More specifically, the subsequent radio wave interrogation signal to be transmitted after receipt of a radio wave response signal has a spectrum that has been shifted with respect to said received radio wave response signal. By shifting the central frequency, interference of received and transmitted signals is advantageously counteracted. Similarly, a subsequent radio wave response signal to be transmitted at the tag, after receipt of a radio wave interrogation signal, has a spectrum that has been shifted with respect to said received radio wave interrogation signal.

As a result, the central frequency of a radio wave signal travelling between the agent and the tag is shifted when the signal is retransmitted by either the agent or the tag. In the shown embodiment, a received signal is mixed with a signal generated by a local oscillator, thereby shifting the central frequency of the signal. If a received signal comprises a multiple number of signal components, all these components are converted to a new signal component having a shifted spectrum. At the agent, the shifted signal components are added to the carrier signal, thereby filling the instant spectrum content of the signals to be transmitted.

If the carrier signal has a frequency bandwidth of circa 1 kHz, the applied frequency shift can also be circa 1 kHz. If 1000 frequency shifts are applied to reach the pre-determined frequency band, a total spectrum band of 1 MHz can be needed to perform the measurement.

Figure 3A:
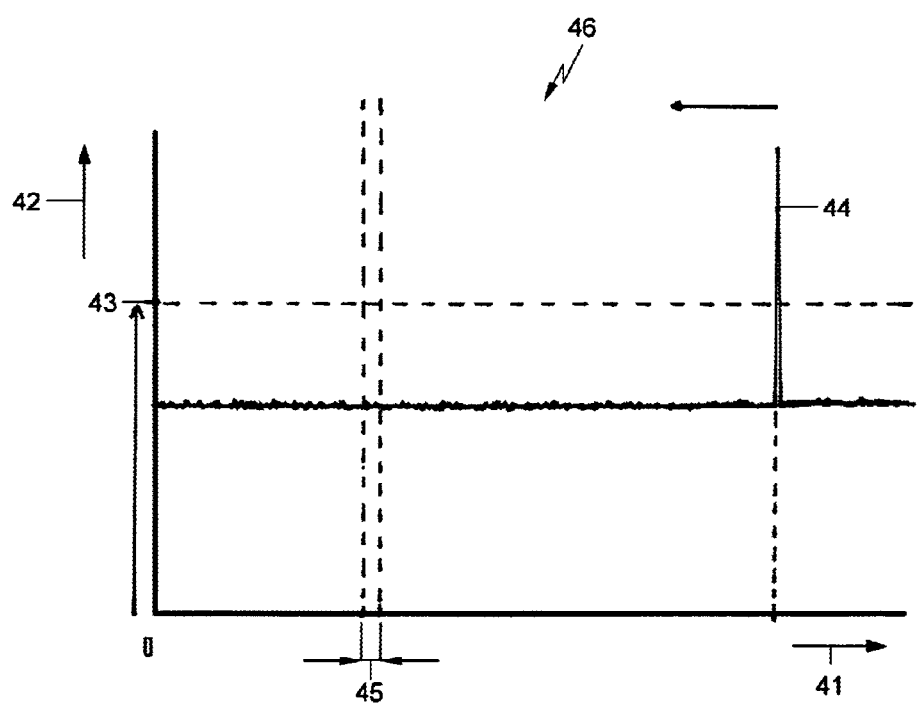
FIG. 3a shows a spectrum at a first instance.

FIG. 3a shows a spectrum of the radio wave signals at a first instance. Here, a signal power 42 (dBm) is shown as a function of the frequency 41 (Hz). The spectrum 46 shows a first radio wave interrogation signal 44, also called the signal carrier.

Figure 3B:
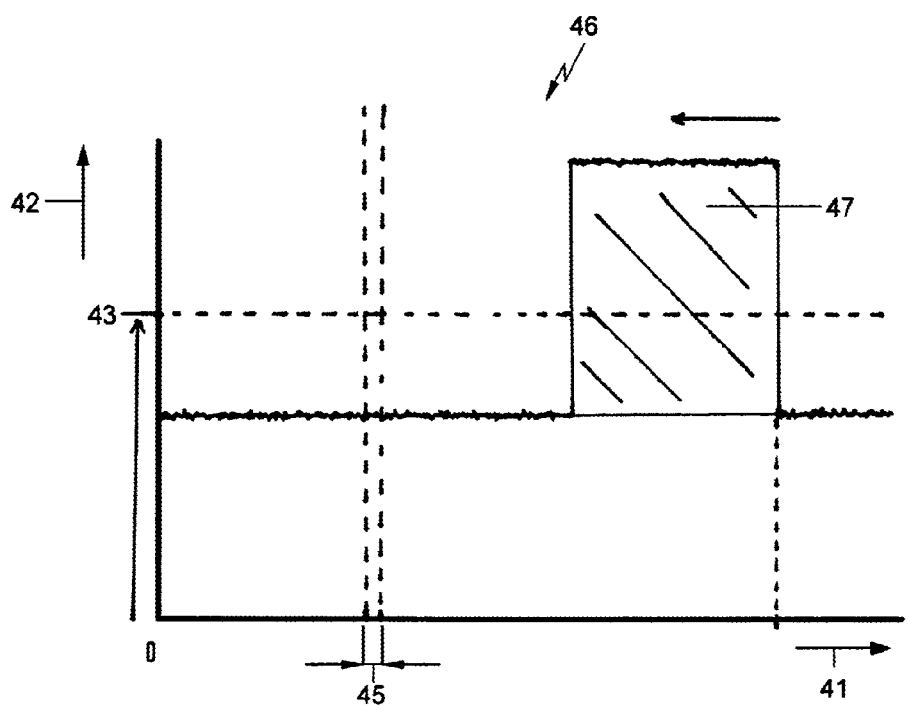
FIG. 3b shows a spectrum at a second instance.

FIG. 3b shows the spectrum 46 at a second instance when a multiple number of radio wave interrogation signals and radio wave response signals are transmitted. The central frequency of new radio wave signals are shifted downwards with respect to the central frequency of the preceding radio wave signal. Therefore, the signal spectrum 47 fills downwardly.

Figure 3C:
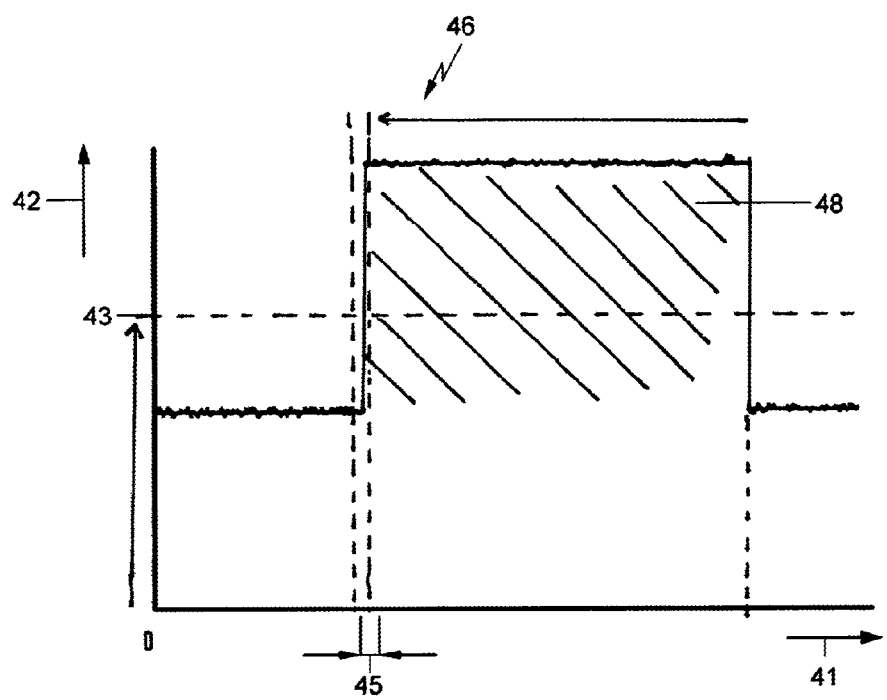
FIG. 3c shows a spectrum at a third instance.

FIG. 3c shows the spectrum 46 at a third instance when the signal spectrum 48 has been further filled until a pre-determined frequency band 45 is reached. The agent 20 is arranged for detecting that a signal has a power exceeding a threshold value 43 in a pre-determined frequency band 45.

In order to perform the detection, the further band pass filter 38 is set to pass the pre-determined frequency band 45. The thus obtained band passed signal is amplified by the logarithmic amplifier 39 and fed to the Schmitt trigger 40 to detect whether the signal power is higher than the pre-determined threshold value 43.

If such a signal having a spectrum in the pre-determined frequency band 45 with a higher power than the pre-determined threshold value 43 is detected, the first counter 35 is stopped. As a result, a first time period starting at the start of transmitting the first radio wave interrogation signal and ending upon receipt of a radio wave response signal having a pre-determined signal behaviour is determined. The first time period accounts for the total propagation time of the subsequent interrogation signals and response signals travelling from the agent towards the tag and vice versa, respectively.

Then, the processor 37 computes a distance between the agent and the tag, based on the first determined time period and the multiple number of radio wave interrogation signals that have subsequently been transmitted by the agent transmitter. The total number of subsequent transmitted interrogation signals is related to the frequency difference between the central frequency of the carrier signal and the pre-determined frequency band, and the frequency shifts applied upon retransmitting a radio wave signal by the agent or the tag. More specifically, the total propagation length is the sum of all subsequent interrogation and response signal paths. The distance between the agent and the tag can be computed as the velocity of light (approximately 299792458 m/s) multiplied by the determined first time period and divided by the total number of radio wave interrogation and reflection paths.

Therefore, when applying a fixed radio wave interrogation and response signal sequence, the number of radio wave interrogation and response paths is constant, while the determined first time period depends linearly on the distance between agent and the tag.

The accuracy of the distance measurement depends on the accuracy of the counters 35, 36. If the counters are based on an internal clock having a frequency of 3 GHz, the expected accuracy is not better than circa 10 cm.

After detecting that a signal has a power exceeding a threshold value 43 in the pre-determined frequency band 45, transmission of the carrier signal 44 is stopped.

Figure 3D:
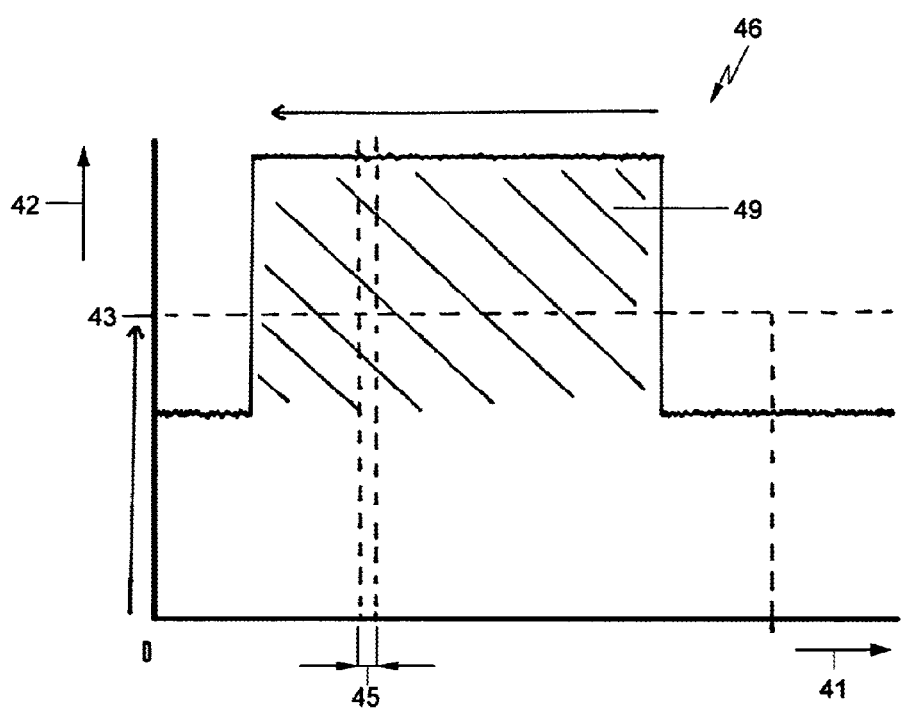
FIG. 3d shows a spectrum at a fourth instance.
Figure 3E:
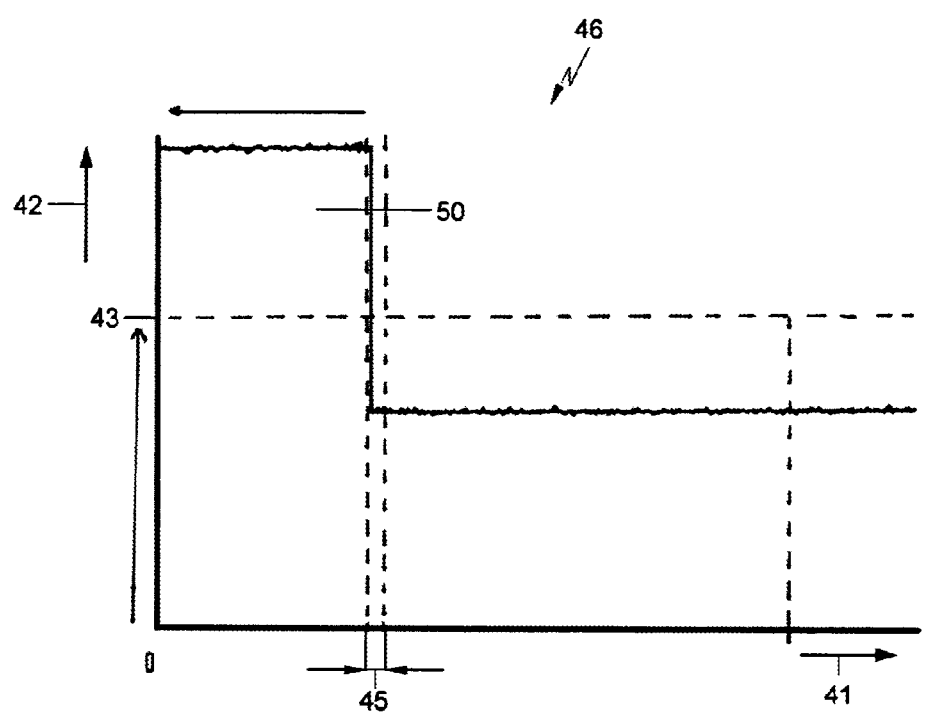
FIG. 3e shows a spectrum at a fifth instance.
Figure 3F:
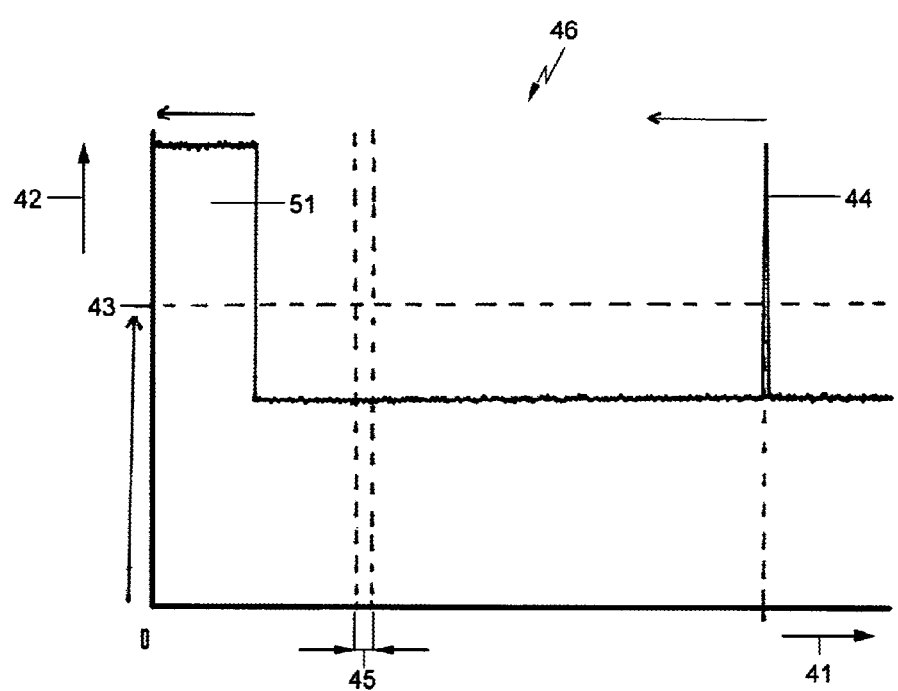
FIG. 3f shows a spectrum at a sixth instance.

FIGS. 3d-3f show the spectrum at subsequent further instances. As can be seen, the first radio wave interrogation signal is not transmitted anymore and the entire signal spectrum block 49 is shifted downwardly until the signal having the highest central frequency passes the predetermined frequency band 45. The agent 20 is also arranged for detecting that a signal having the predetermined central frequency band and having a power exceeding a threshold value 43 is at a particular moment not present anymore in the signal spectrum block 50. At the instant shown in FIG. 3f, the entire measurement cycle is repeated again, starting with the transmission of the first radio wave interrogation signal 44, the carrier signal.

When transmission of the carrier is stopped, optionally a second counter 36 is started. When it is detected, by means of the further band pass filter 38, the logarithmic amplifier 39 and the Schmitt trigger 40, that the radio wave response signal having the predetermined signal behaviour is not received anymore at the measurement agent, the second counter 36 is stopped, thereby determining a further period between stopping transmission of the carrier signal and ending receiving the signal having the pre-determined signal behaviour, i.e. having a power in the pre-determined frequency band 45. The computation of the distance between the agent and the tag can now also be based on the further determined time period. As an example, the average of the first and second time periods can be used as a total average propagation time of the respective interrogation and response signals. As a result, a more accurate distance can be obtained as inaccuracies in the measurement signals can at least partially be compensated.

It is noted that instead of determining both the first time period and the second time period, also merely one of them can be determined. Further, in order to determine the first time period, transmission of the carrier signal can be stopped upon receipt of the first radio wave response signal at the agent, thereby reducing the used signal spectrum and avoiding signal interference with other users of the spectrum, e.g. measurements of other distances.

In the described embodiments, the frequency shift can be chosen as a fixed shift. Then, the frequency of the signal generated by the local oscillators is kept constant. The value of the frequency shift can be specific for a particular tag, thus providing a possibility of identifying the tag among a multiple number of tags. However, the frequency shift can also be chosen to vary, e.g. depending on the number of radio wave signals that have already been transmitted in a measurement cycle. Further, instead of shifting the central frequency downwardly, the central frequency can also be shifted upwardly. Further, a combination of upward and downward conversion can be applied. In principle, an arbitrary conversion sequence scheme can be chosen before reaching the pre-determined frequency band, preferably avoiding intermediate overlap of frequencies.

Optionally, a distance from a particular tag to two or more measuring agents can be measured, in a contactless way, e.g. for localizing the tag. Preferably, the mutually different signal behaviour of the subsequent radio wave interrogation signals of the respective measuring agents are chosen such that instantly transmitted radio wave interrogation signals do not interfere.

On the other hand, the measurement agent can further be arranged for measuring, in a contactless way, a distance to a further tag, e.g. by starting transmitting a further carrier signal in another frequency band. In order to trigger a particular tag to transmit a radio waves response signal, a separate trigger signal can be transmitted to the particular tag. Alternatively, the carrier signal can be modulated using identification information of the particular tag to be triggered.

It is noted that the method step of computing a distance between the agent and the tag, based on the determined time period and the multiple number of radio wave interrogation signals that have subsequently been transmitted by the agent transmitter, can be performed using dedicated hardware structures, such as FPGA and/or ASIC components. Otherwise, said method step can also at least partially be performed using a computer program product comprising instructions for causing the processor to perform the above described step of the method according to the invention.

Figure 4:
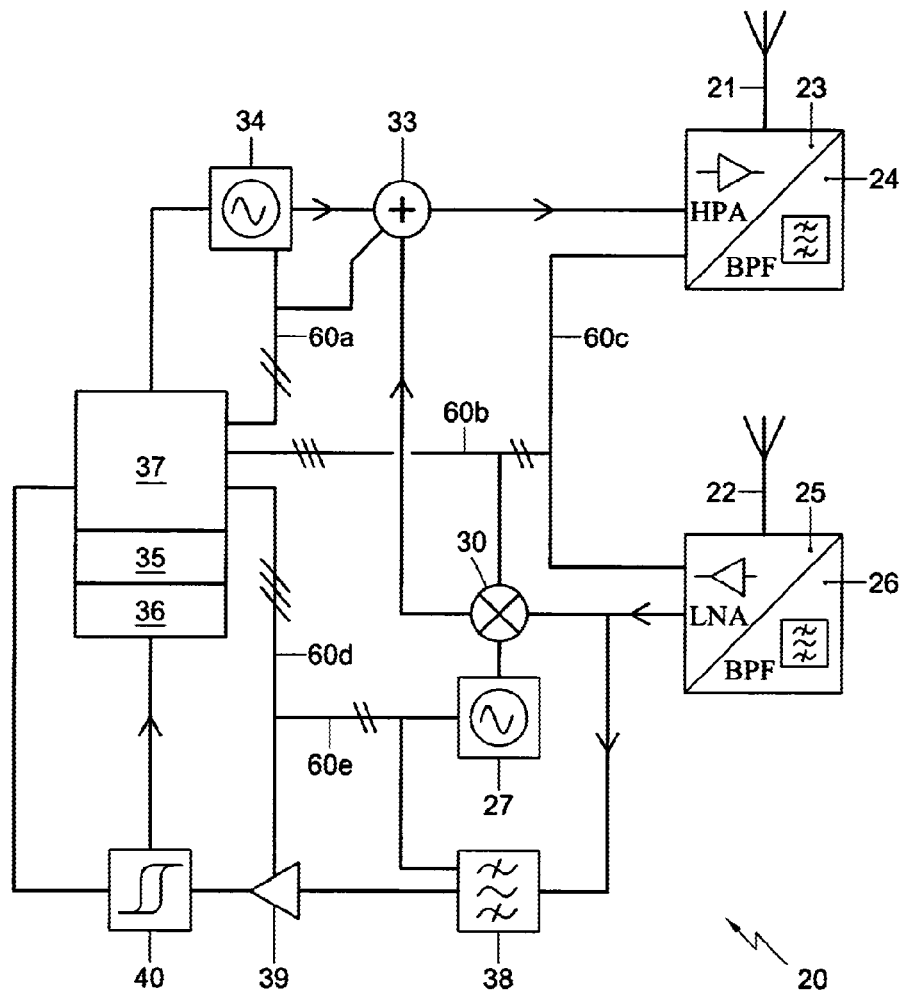
FIG. 4 shows a schematic view of a second embodiment of a measurement agent according to the invention.

FIG. 4 shows a schematic view of a second embodiment of a measurement agent 20 according to the invention. The agent 20 comprises a multiple number of control lines 60a-e for controlling operating parameters of electrical components, such the amplifiers, filters and the local oscillator 27, thereby providing a flexible design rendering the agent applicable in a wide variety of measurement situations. Control commands can be initiated by processor 37.

Figure 5:
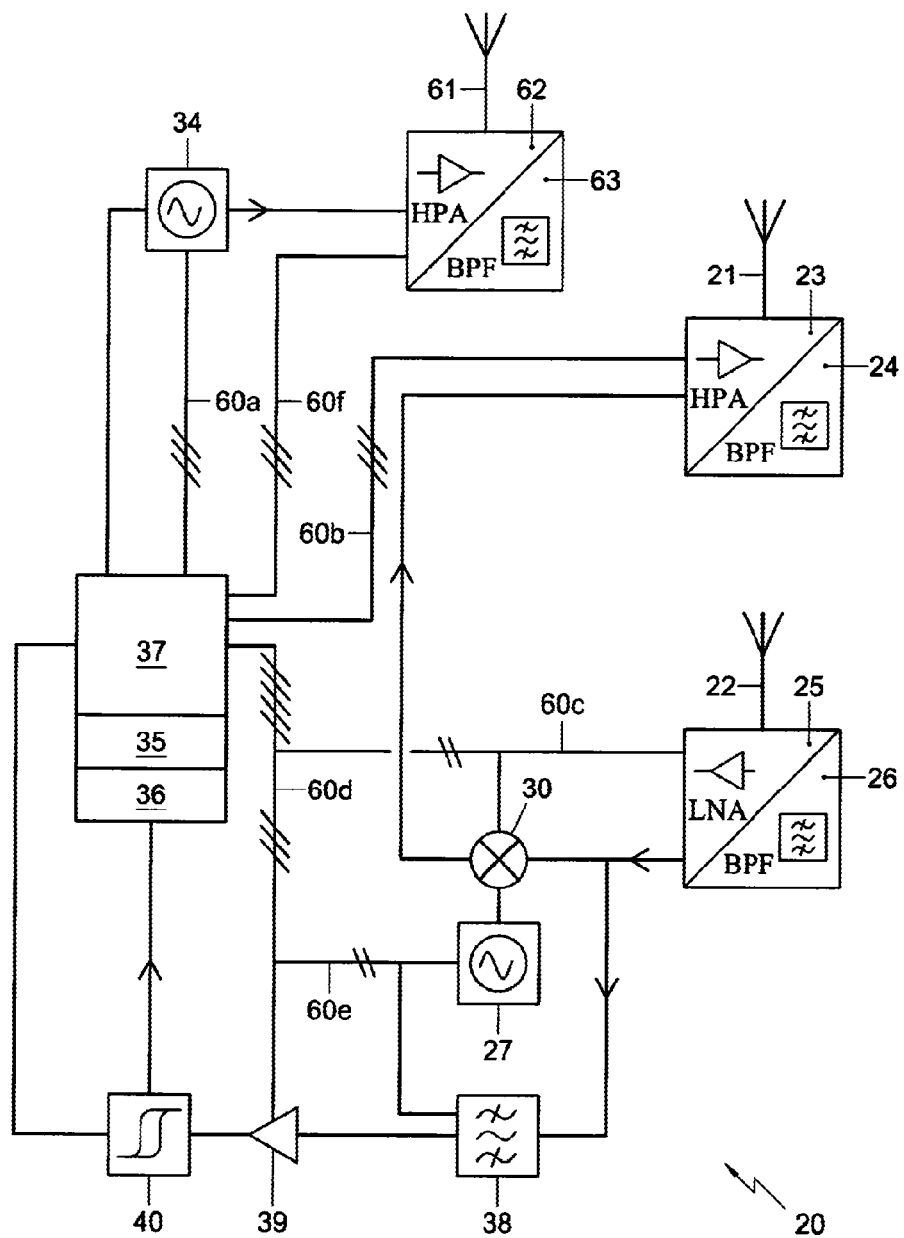
FIG. 5 shows a schematic view of a third embodiment of a measurement agent according to the invention.

FIG. 5 shows a schematic view of a third embodiment of a measurement agent 20 according to the invention. Here, the agent 20 comprises a further transmitter 61 connected to a further high power amplifier 62 and a band pass filter 63 for exclusively transmitting the carrier signal. As a result, transmission of the carrier signal on the one hand and the shifted signals on the other hand is electrically separated thereby counteracting undesired interference between the shifted signals and the carrier signal. Moreover, transmission characteristics of the carrier signal and the shifted signals can be set independently.

Figure 6:
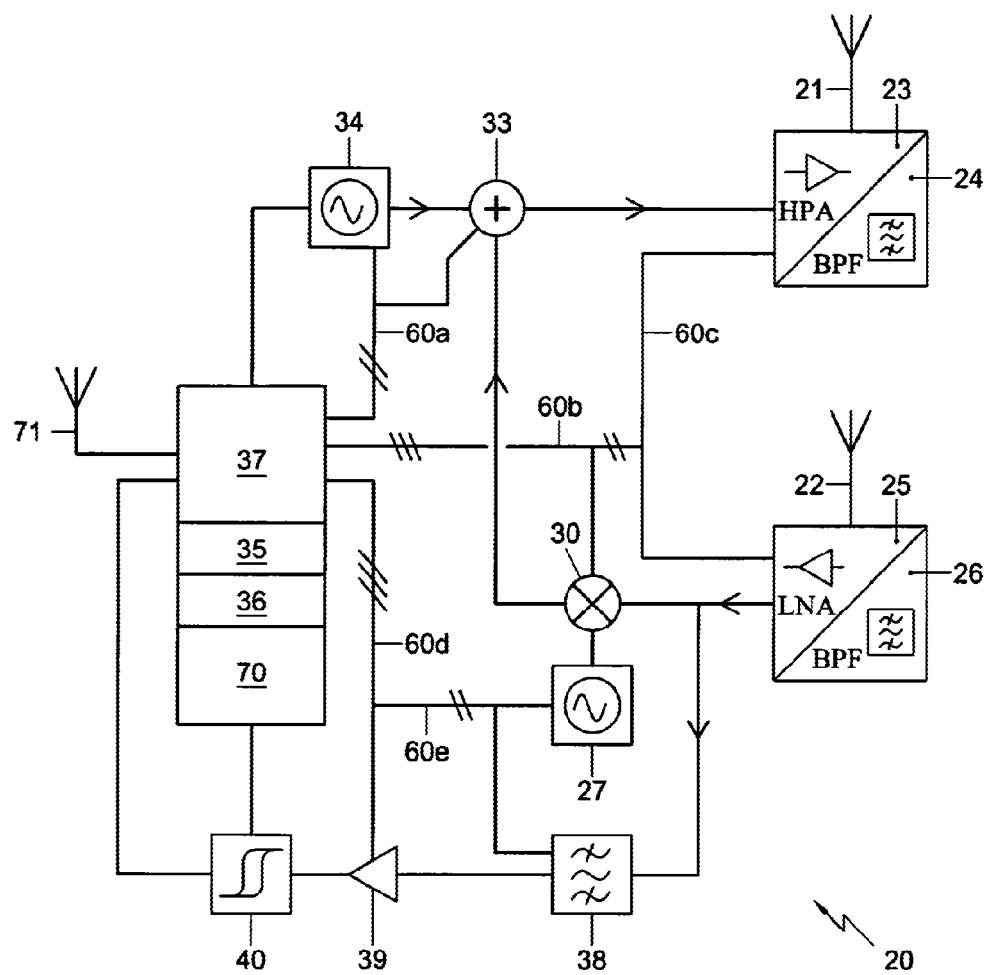
FIG. 6 shows a schematic view of a fourth embodiment of a measurement agent according to the invention.

FIG. 6 shows a schematic view of a fourth embodiment of a measurement agent 20 according to the invention. In the fourth embodiment of the agent 20 an identifier unit 70 has been included for identification purposes. Optionally, also a tag can be provided with an identifier unit 70. Further, the agent 20 comprises an additional transmitter 71 that is arranged for transmitting, under the control of the processor 37, an identifying signal, e.g. for receipt at a tag so as to trigger a tag to respond to an interrogation signal. As an example, the identifying signal can be transmitted using standard communication devices such as Wifi or cellular based systems, thus realizing a backchannel for separate one-way or two-way communication between an agent and a tag, between agents and/or between tags.

The tag can be mounted on an object which position is to be tracked, e.g. a ship. Further, the agent can be mounted on a beacon having a fixed and known position.

The invention is not restricted to the embodiments described herein. It will be understood that many variants are possible.

Since the measurement agent includes the components of the claimed tag, the measurement agent can not only act on its role as an agent, but can also serve as a tag, thereby enabling measuring a distance between two measurement agents.

The tag and/or the measurement agent can be provided with further and/or other components for (pre-)processing a received signal or a signal to be transmitted, e.g. for reducing noise signals.

Further, additional steps can be performed otherwise, e.g. digitally. As an example, the step of shifting the central frequency of the signals to be transmitted can be performed otherwise, e.g. by a digital control unit. As a further example, the further band pass filter, the logarithmic amplifier and the Schmitt trigger can be replaced by another signal processing system, including e.g. a digital signal processor (DSP).

Also, the pre-determined frequency band for triggering the first counter to stop may dynamically be chosen depending e.g. on a specific tag to which a distance is measured.

In addition, the computation of the distance between the agent and the tag can further be based on a processing time in the signal path between receipt of a signal until a new signal is transmitted by the agent or the tag, thereby further improving the accuracy of the distance measurement.

Other such variants will be obvious for the person skilled in the art and are considered to lie within the scope of the invention as formulated in the following claims.

What is claimed is:

1. A measurement agent for measuring, in a contactless way, a distance to a tag, the measurement agent comprising:
    an agent transmitter for subsequently transmitting a plurality of radio wave interrogation signals to a receiver of the tag, the plurality of radio wave signals having a mutually different signal behavior,
    a receiver for receiving a radio wave response signal transmitted by a tag transmitter of the tag,
    a counter, and
    a processor, wherein:
        the measurement agent iteratively changes, upon receiving the radio wave response, the agent transmitter from a first state wherein the agent transmitter transmits a first radio wave interrogation signal having a first spectrum to a second state wherein the agent transmitter transmits a second radio wave interrogation signal having a second spectrum that is different from the first spectrum, such that in each iteration after an initial iteration the first state corresponds to the second state of an immediately preceding iteration,
        the counter determines a time period starting at a first transmission of the first radio wave interrogation signal and ending upon receipt of the radio wave response signal having a power exceeding a threshold in a pre-determined frequency band, and
        the processor has instructions stored which, when executed by the processor, cause the processor to compute a distance between the agent and the tag, the distance being a velocity of light multiplied by the time period and divided by an integrated path number that is equal to a total number of radio wave interrogation signals added to a total number of radio wave response signals.

2. A measurement agent according to claim 1, wherein the mutually different signal behavior of the plurality of radio wave interrogation signals comprises mutually different spectra.

3. A measurement agent according to claim 2, wherein the second spectrum of the second radio wave interrogation signal is shifted with respect to the first radio wave interrogation signal.

4. A measurement agent according to claim 1, wherein the second spectrum of the second radio wave interrogation signal is shifted with respect to the radio wave response signal.

5. A tag for facilitating measuring, in a contactless way, a distance to a measurement agent, the tag comprising:
a receiver for receiving a radio wave interrogation signal transmitted by a agent transmitter of the measurement agent, and
a tag transmitter for subsequently transmitting a plurality of radio wave response signals to a receiver of the measurement agent, the plurality of radio wave signals having a mutually different signal behavior, wherein:
the tag iteratively changes the tag transmitter from a first state wherein the tag transmitter transmits a first radio wave response signal having a first spectrum to a second state wherein the tag transmitter transmits a second radio wave response signal having a second spectrum that is different from the first spectrum upon receiving the radio wave interrogation signal, such that in each iteration after an initial iteration the first state corresponds to the second state of an immediately preceding iteration,
when the second radio wave response signal has a power exceeding a threshold in a pre-determined frequency band the second radio wave response signal triggers a counter of the measurement agent to determine a time period which begins when the measurement agent performs an initial transmission of radio wave interrogation signal and ending when the measurement agent receives the second radio wave response signal having the power exceeding the threshold in the pre-determined frequency band, and
wherein receiving the second radio wave response signal having the power exceeding the threshold in the pre-determined frequency band triggers the measurement agent to compute the distance between the measurement agent and the tag based on a velocity of light multiplied by the time period and divided by an integrated path number that is equal to a total number of radio wave interrogation signals added to a total number of radio wave response signals.

6. A tag according to claim 5, wherein the second radio wave response signal has a spectrum that has been shifted with respect to the radio wave interrogation signal, the frequency shift being specific for the tag.

7. A method for measuring, in a contactless way, a distance from a measurement agent to a tag, the method comprising:
consecutively transmitting a plurality of radio wave interrogation signals from the measurement agent to the tag, the consecutive plurality of radio wave interrogation signals having a mutually different signal behavior;
receiving a radio wave response signal transmitted by the tag;
iteratively changing the measurement agent from a first state wherein a first radio wave interrogation signal having a first spectrum is transmitted to a second state wherein a second radio wave interrogation signal having a second spectrum that is different from the first spectrum upon receiving the radio wave response, such that in each iteration after an initial iteration the first state corresponds to the second state of an immediately preceding iteration;
determining a time period starting at a first transmission of the first radio wave interrogation signal and ending upon receipt of the radio wave response signal having a power exceeding a threshold in a pre-determined frequency band, and
computing, using a computer, a distance between the measurement agent and the tag, the distance being a velocity of light multiplied by the time period and divided by an integrated path number that is equal to a total number of radio wave interrogation signals added to a total number of radio wave response signals.

8. A method according to claim 7, wherein iteratively changing of the measurement agent from the first state to the second state further comprises:
converting the radio wave response to a new signal having a shifted spectrum, and
transmitting the new signal as the second radio wave interrogation signal.

9. A method according to claim 7, further comprising:
continually transmitting the first radio wave interrogation signal until the radio wave response signal is received.

10. A method according to claim 7, further comprising measuring, in a contactless way, an additional distance from to and additional tag.

11. A method according claim 7, wherein the first radio wave interrogation signal and the second radio wave interrogation signal are defined such that the first radio wave interrogation signal and second radio wave interrogation signal do not cause interference with one another.

12. A method according to claim 7, further comprising localizing the tag, in combination with measurements from other agents.

13. A method according to claim 7, comprising triggering a particular tag to transmit the radio wave response signal.

14. A method for facilitating measuring, in a contactless way, a distance from a measurement agent to a tag, the method comprising:
receiving a radio wave interrogation signal transmitted by the measurement agent;
iteratively transmitting a plurality of radio wave response signals to the measurement agent upon receipt of the radio wave interrogation signal, the plurality of radio wave response signals having a mutually different signal behavior; and
changing the tag from a first state wherein the tag transmits a first radio wave response signal having a first spectrum to a second state wherein the tag transmits a second radio wave response signal having a second spectrum that is different from the first spectrum upon identifying a change in frequency in the radio wave interrogation signal, such that in each iteration after an initial iteration the first state corresponds to the second state of an immediately preceding iteration,
wherein a trigger radio wave response signal triggers a counter of the measurement agent that determines, via a processor, a time period starting at a first transmission of the first radio wave interrogation signal and ending upon the measurement agent receiving the trigger radio wave response signal, the trigger radio wave response signal having a power exceeding a threshold in a pre-determined frequency band, and
wherein a distance between the measurement agent and the tag is computed based on a velocity of light multiplied by the time period and divided by an integrated path number that is equal to a total number of radio wave interrogation signals added to a total number of radio wave response signals.

15. A computer program product having computer readable code stored which, when executed by a processor, cause the processor to measure, in a contactless way, a distance from a measurement agent to a tag, by performing operations comprising:
computing a distance between the measurement agent and the tag, based on a time period and a plurality of radio wave interrogation signals that have been transmitted,
wherein the time period starts at a fist transmission of a first radio wave interrogation signal and ends upon receipt at the measurement agent of a radio wave response signal having a power exceeding a threshold in a pre-determined frequency band, the measurement agent comprising:
an agent transmitter for sequentially transmitting a plurality of radio wave interrogation signals to a receiver of the tag, the plurality of radio wave signals having a mutually different signal behavior, and
a receiver for receiving a radio wave response signal transmitted by the agent transmitter of the tag, and
wherein the measurement agent iteratively changes the agent transmitter from a first state wherein the agent transmitter transmits a first radio wave interrogation signal having a first spectrum to a second state having a second spectrum that is different from the first spectrum upon receiving the radio wave response signal, such that in each iteration after an initial iteration the first state corresponds to the second state of an immediately preceding iteration.

16. A measurement agent for measuring, in a contactless way, a distance to a tag, the measurement agent comprising:
an agent transmitter for sequentially transmitting a plurality of radio wave interrogation signals to a tag receiver of the tag, the plurality of radio wave signals having a mutually different signal behavior, and
an agent receiver for receiving a radio wave response signal transmitted by a tag transmitter of the tag,
a processor,
wherein the measurement agent iteratively changes the agent transmitter from a first state wherein the agent transmitter transmits a first radio wave interrogation signal having a first spectrum to a second state wherein the agent transmitter transmits a second radio wave interrogation signal having a second spectrum that is different from the first spectrum upon identifying a frequency change in the radio wave response signal, such that in each iteration after an initial iteration the first state corresponds to the second state of an immediately preceding iteration,
the measurement agent further comprising a counter that determines a time period starting at a first transmission of the first radio wave interrogation signal and ending upon receipt of the radio wave response signal having a power exceeding a threshold in a pre-determined frequency band, and
the processor has instructions stored which, when executed by the processor, cause the processor to perform operations comprising computing a distance between the measurement agent and the tag based on the time period and a number of radio wave interrogation signals in the plurality of radio wave interrogation signals that have been transmitted by the agent transmitter.

17. A method for measuring, in a contactless way, a distance from a measurement agent to a tag, the method comprising:
consecutively transmitting a plurality of radio wave interrogation signals from the measurement agent to the tag, the plurality of radio wave interrogation signals having a mutually different signal behavior;
receiving a radio wave response signal transmitted by the tag;
iteratively changing the measurement agent from a first state wherein the measurement agent transmits a first radio wave interrogation signal having a first spectrum to a second state wherein the measurement agent transmits a second radio wave interrogation signal having a second spectrum that is different from the first spectrum upon identifying a frequency shift in the radio wave response signal, such that in each iteration after an initial iteration the first state corresponds to the second state of an immediately preceding iteration;
determining a time period starting at an initial transmission of the first radio wave interrogation signal and ending upon receipt of the radio wave response signal having a power exceeding a threshold in a pre-determined frequency band,
determining a number of radio wave interrogation signals transmitted by the agent transmitter during the time period, and
computing, using a computer, a distance between the measurement agent and the tag, based on the time period and a number of radio wave interrogation signals that have been transmitted.

18. The measurement agent of claim 1, wherein the measurement agent continues iteratively changing the agent transmitter from the first state to the second state upon receiving the radio wave response until the radio wave response has the power exceeding the threshold in the pre-determined frequency band.

19. The measurement agent of claim 1, wherein the agent transmitter continues iteratively changing the agent transmitter from the first state to the second state after having received the radio wave response having the power exceeding the threshold in the pre-determined frequency band.

20. The measurement agent of claim 1, wherein the second radio wave interrogation signal is not transmitted until the radio wave response signal is received.

* * * * *